May 27, 1958 R. A. KOLPEK 2,836,654

TRANSMITTER IDENTIFYING UNIT FOR USE IN A TELEGRAPH SYSTEM

Filed March 1, 1955 2 Sheets-Sheet 1

INVENTOR.
ROBERT A. KOLPEK
BY Wm. Walter Owen
ATTY.

May 27, 1958 R. A. KOLPEK 2,836,654

TRANSMITTER IDENTIFYING UNIT FOR USE IN A TELEGRAPH SYSTEM

Filed March 1, 1955 2 Sheets-Sheet 2

*INVENTOR.*

ROBERT A. KOLPEK

BY Wm. Walter Owen

ATTY.

2,836,654

TRANSMITTER IDENTIFYING UNIT FOR USE IN A TELEGRAPH SYSTEM

Robert A. Kolpek, Waukegan, Ill., assignor to General Telephone Laboratories, Incorporated, a corporation of Delaware Application March 1, 1955, Serial No. 491,284

6 Claims. (Cl. 178—17)

This case relates in general to automatic telegraph switching systems and more particularly to a system for sending, with each transmitted message, a number identifying the transmitting unit responsible for the transmission of the message.

Although the preferred embodiment of the invention proposed herein has been adapted for use in the automatic telegraph switching system disclosed in the copending application of R. C. Stiles, Serial No. 260,854, filed December 10, 1951, Patent No. 2,805,283, issued Sept. 3, 1957, it is not limited specifically to its use therein. However, the disclosure of said Stiles application is hereby incorporated herein by reference, to the same extent as if it were set forth in full herein.

In the system disclosed in said Stiles application, each one of a plurality of transmitting devices is connectable to each one of a plurality of outgoing lines; however, there is no provision for identifying which transmitter is utilized for retransmitting a particular message over a selected outgoing line. Consequently, if a message being retransmitted over one of the outgoing lines becomes garbled due, for example, to a defective transmitter, it will be a cumbersome and tedious task to determine which transmitter is faulty and to determine which message has been garbled.

Accordingly, it is a primary object of the present invention to provide a means for transmitting over an outgoing line, prior to the transmission of a message thereover, a number corresponding to the transmitter which is sending said message.

It is another object of this invention to provide an identity transmitting means which is common to all outgoing message transmitters in the switching center.

A feature of this invention is the use of permanently marked banks of an automatic switch together with a transmitting device connectable to said switch for transmitting information in accordance with the bank markings for purposes of identification.

Another feature is the use of a transmitting mechanism together with a plurality of selectable automatic switches, the banks of which are permanently strapped in a desired manner for sending information for purposes of identification.

In order to provide a better understanding of the present invention, the operation of the switching system in said Stiles application will be briefly discussed in so far as it is believed pertinent to the present invention. Attention is directed to Fig. 1 herein in which the reference numeral of each element is the same as its corresponding element in the Stiles application, except that the letter X is affixed after each reference character of said Fig. 1. When a message from a distant office UEPX is received at the incoming line circuit 400X of the switching center, a reperforator 330X records said message on a tape 333X, which tape is fed to a tape reader 340X. Upon the successful detection of a start of message code by the tape reader 340X, a director 200AX is seized for the purpose of controlling the routing of the message in accordance with the routing instructions included in the message. The director seizes an available cross office unit such as 3400X by way of a selector such as 3300X, causes said cross office unit to be connected to a desired outgoing line such as L1X by way of its selector 4300X, and then causes said cross office unit 3400X to be connected to the transmitting device 360X in said incoming line circuit. The tape 333X is then fed to said transmitting device 360X for retransmission of the message to the cross office unit 3400X. A reperforator 3410X records the message on a second tape 3413X in the cross office unit 3400X; and, when the desired outgoing line L1X is idle, a second transmitting device 3430X, individual to cross office unit 3400X, will retransmit said message over said outgoing line.

The applicant herein now proposes to provide in each cross office unit a special rotary switch which includes a wiper set having several step positions and which includes bank contacts, the bank contacts accessible to the wipers in certain of said wiper positions being marked in a manner corresponding to telegraph code combinations. A cross office identifying unit 200, common to all cross office units as shown in Fig. 1, is provided. Said identifying unit has a transmitting mechanism which is connected to a selecting switch, the bank contacts of which selecting switch are connected to the wipers of the above-mentioned special switches in the cross office units. When one of the cross office units is ready to transmit a stored message over an idle outgoing line, the cross office identifying unit is started, seizes said one cross office unit by way of the cross office unit's respective special switch and connects said special switch to the character sensing contacts of the transmitter of the identifying unit. The transmitter sends impulses over the outgoing line in accordance with the marking of the bank contacts of the cross office unit special switch for the purpose of identifying the cross office unit from which the message is being sent. Then the transmitter of the identifying unit is disconnected from the outgoing line and the transmitter of the cross office unit is connected to said outgoing line for the transmission of the message thereover.

The transmitting mechanism used in the cross office identifying unit may be of type disclosed in the U. S. Patent No. 2,296,845 granted to N. T. Goetz on September 29, 1942.

*Detailed description*

Figure 1:
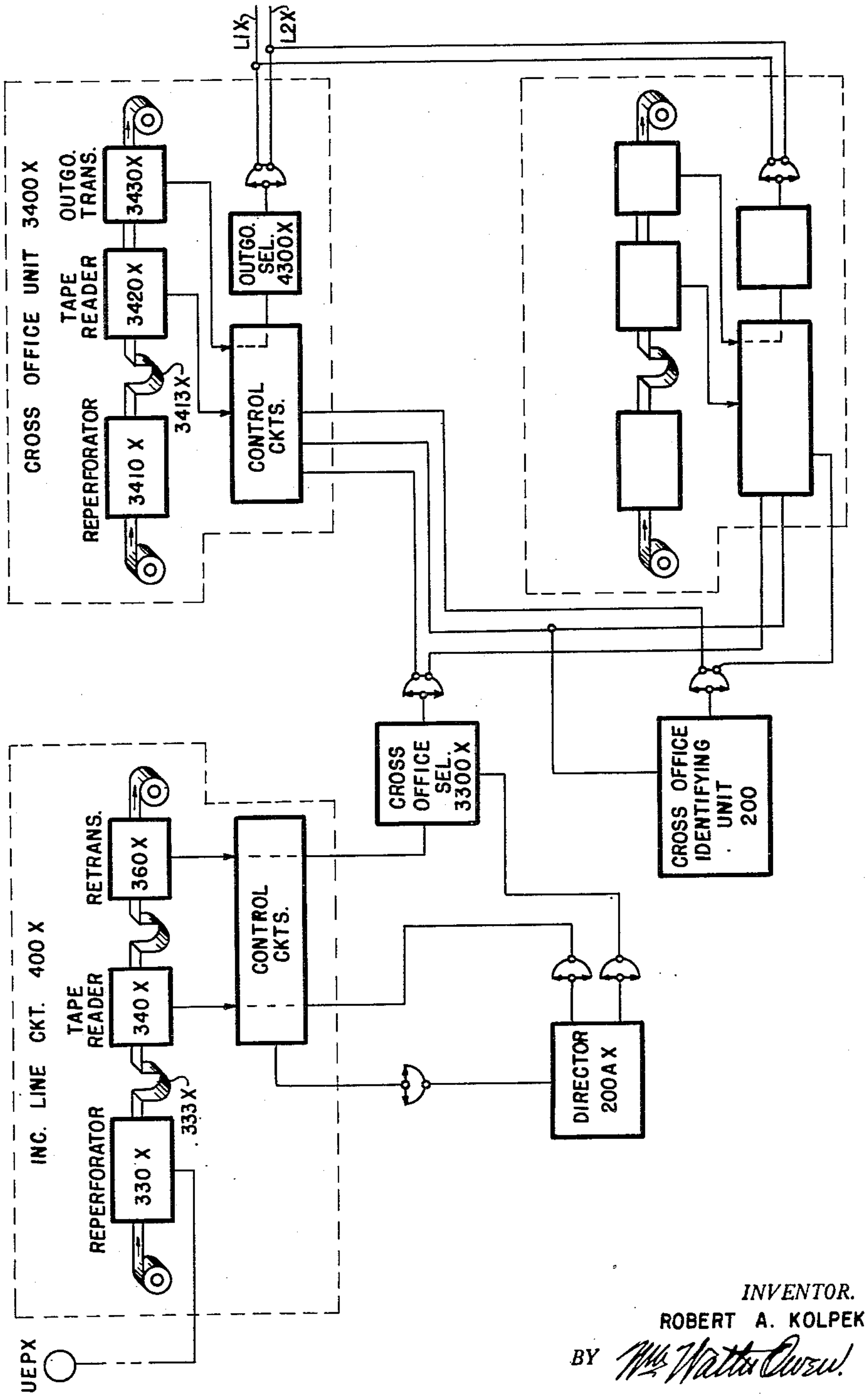

Assume that the cross office unit 3400X has a message stored therein, that its outgoing selector 4300X has been connected to the circuit for the outgoing line L1X, and that said outgoing line is idle. The test relay R3930X will be operated over a circuit extending from battery through the winding of R3930X, contacts 244, wiper 273 through contacts 247 to ground. Said test relay R3930X starts equipment (not shown) which causes the test guard relay R3940X to operate over a circuit (partially shown) including the upper winding of R3940X, wiper 277 and through the winding of the guard relay R4350X to battery. Said guard relay R4350X also operates over said circuit. The test guard relay R3940X completes an obvious locking circuit for itself and for the guard relay R4350X at contacts 242; at contacts 244, restores the test relay R3930X; at contacts 245, prepares a locking circuit for relay R235; at contacts 243, prepares a circuit for operating the test relay R205; and, at contacts 241, extends ground potential to the magnet M229 of selector switch 202 by way of contacts 206, 211 and 216. At contacts 246, the guard relay R4350X further prepares a circuit for operating the test relay R205 in series with transmit relay R250.

If, when ground potential is extended to M229 as described above, the wipers 260–267 of switch 202 are connected to a cross office unit other than 3400X, M229 is operated and completes at contacts 230 an obvious circuit for operating the interrupter relay R215. At contacts 216, R215 opens the circuit to M229; and the wipers 260–267 are moved one step. When M229 restores, it also restores R215 so that M229 can reoperate. This sequence of operations of M229 and R215 is repeated until the wipers 260–267 engage the contacts to which cross office unit 3400X is connected; then relays R205 and R250 are operated over a circuit extending from ground through the winding of R205, wiper 260, contacts 236 and 243, wiper 278 and contacts 246, through the lower winding of R250 to battery. At contacts 206, R205 opens the operating circuit of M229 to prevent its further operation; at contacts 207, relay R205 completes an obvious circuit for operating the clutch magnet M220 of the transmitter 201 to initiate the cyclic operation of said transmitter; and, at contacts 208, prepares a circuit for operating relay R210.

The five code sensing contacts 226–222 of transmitter 201 are now connected to the wipers 271–275 respectively of the marking switch 203 by way of wipers 262–266 of the selector switch 202. Contacts 221 are the start-stop contacts of transmitter 201, and contacts 227 of transmitter 201 are the pulse per character contacts of transmitter 201. As is well known in the art, all of said contacts 221–227 are cyclically operated by a cam controlled by the clutch magnet M220; at the start of a cycle of operation of the transmitter 201, the start-stop contacts 221 are opened; then each of the code sensing contacts 226–222 are momentarily operated for equal time intervals, contacts 226 operating first followed by the operations of contacts 225, 224, 223 and then 222 respectively; then the start-stop contacts 221 are again closed. The pulse per character contacts 227 are closed during the entire time interval during which contacts 226–222 are operated.

Before the transmit relay R250 operates, a polar relay R4440X for sending impulses over the outgoing line L1X is held operated over a circuit including the resistance element 4355X, contacts 252 and the conductor C4366X; however, when R250 operates, it connects said polar relay to ground potential at the transmitter 201 by way of conductor 4366X, contacts 251, wiper 279, contacts 239, wiper 267, the signal conductor 280 and contacts 221.

Figure 2:
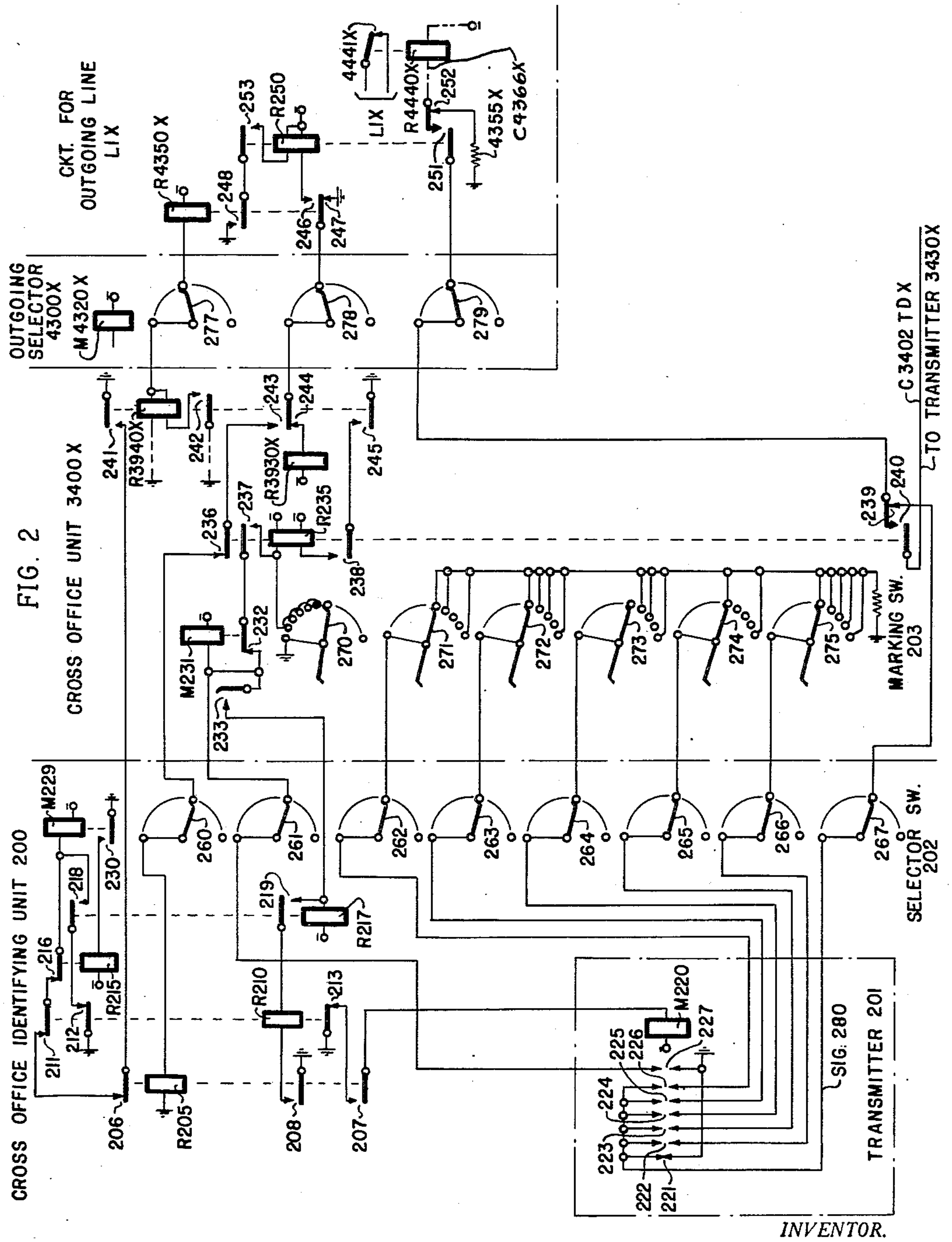

Attention is directed to the special marking switch 203 of the cross office unit 3400. The wipers 270–275 are forced to the sixth accessible contacts at the end of each cycle of operation. Ground potential is connected to the sixth bank contacts accessible to wipers 271, 272, 274 and 275 to correspond to a figure shift character of a telegraph code; the seventh contacts accessible to wipers 271, 272, 273 and 275 are connected to ground potential to correspond to the character 1 of a telegraph code; the eighth, ninth and tenth contacts accessible to said wipers 271–275 are marked in a similar manner to correspond respectively to the telegraph codes 0, 5 and letters shift. When a cross office unit such as 3400X starts across office identifying unit 200, the marking switch of said cross office unit will have its wipers standing upon the sixth accessible contact in the manner shown in Fig. 2 and the bank contacts of said marking switch will be similarly marked to correspond to a particular multiple character code.

When, as described above, relay R205 operates the clutch magnet M220 to start the transmitter 201, the character sensing contacts 226–222 begin their cycle of operation. Start-stop contacts 221 open to restore the polar relay R4440X. When contacts 226 momentarily close, ground potential is extended from the contact on which wiper 271 is standing over wiper 271 and 262, contacts 226, the signal conductor 280, wiper 267, contacts 239, wiper 279, contacts 251, and conductor C4366X to the above-mentioned polar relay R4440X to momentarily operate said polar relay, thereby to send a pulse over the outgoing line L1X; similarly, when contacts 225 are momentarily closed immediately thereafter, ground potential is extended from the contact upon which wiper 272 is standing over wipers 272 and 263, contacts 225, signal conductor 280 and thence over the circuit described above to the polar relay R4440X to maintain the outgoing line L1X closed; however, when contacts 224 close momentarily, the polar relay R4440X is not operated because ground potential is not connected to the contact upon which wiper 273 is standing; and, when contacts 223 and 222 are subsequently operated, ground pulses are sent to the polar relay R4440X from wipers 274 and 275 respectively to cause said polar relay to close the outgoing line. Thus signals corresponding to a figures shift character of a telegraph code are sent over L1X.

During the time in which contacts 226—222 operate, the pulse per character contacts 227 are maintained operated to energize the magnet M231 of marking switch 203 over a circuit extending from ground over contacts 227, wiper 261, through the winding of M231 to battery. When contacts 222 open at the end of their cycle of operation, contacts 227 also open to deenergize magnet M231. M231 steps the wipers 270–275 to their next positions into engagement with the next accessible contacts. Also when contacts 222 open, the start-stop contacts 221 close to complete one cycle of operation of the transmitter 201. Because magnet M220 is still operated, another cycle will begin.

During the next cycle of operation of the transmitter 201, ground pulses are sent to the polar relay in a similar manner in accordance with the manner in which the seventh accessible contacts of marking switch 203 are wired—i. e. the polar relay R4440X is operated momentarily when contacts 226, 225, 224 and 222 are operated to send impulses over the outgoing line corresponding to the character 1. Also in the manner described above, M231 will be energized at the beginning of the cycle of operation of transmitter 201 and will deenergize at the end of said cycle of operation to step its wipers 270–275 to the eighth accessible contacts.

During the third cycle of operation of transmitter 201, the polar relay R4440X will be momentarily operated in the manner described above when contacts 225, 224 and 222 operate, thereby to send out over the outgoing line impulses corresponding to the character 0. In the manner described above, M231 causes the wipers 270–275 to be stepped to the ninth accessible contacts at the end of said third cycle of operation of transmitter 201.

During the fourth cycle of operation of transmitter 201, the polar relay R4440X will be operated in the manner above when contacts 222 operate thereby to send over the outgoing line an impulse corresponding to the character 5. M231 will in the manner described above step the wipers 270–275 to the tenth accessible contacts at the end of said fourth cycle of operation of transmitter 201.

During the fifth cycle of operation of transmitter 201, the polar relay R4440X will be operated in the manner described above when contacts 226, 225, 224, 223 and 222 operate, thereby to send over the outgoing line impulses corresponding to the letters shift code. At the end of said fifth cycle of operation of transmitter 201, M231 will in a manner described above step the wipers 270–275 to the contacts located in the normal position of the marking switch 203, said contacts being shown in Fig. 2 as the first top contacts in the banks.

The transmitter 201 will run through the sixth cycle of operation; however the polar relay R4440X will not be operated because none of the normal contacts accessible to wipers 271–275 have ground potential connected thereto and therefore the polar relay will cause a signal corresponding to a "blank" to be sent over the outgoing line. During the sixth cycle of operation, the ground potential extended from the pulse per character contacts 227 to the magnet M231 will be further extended over the now closed off normal contacts 233 to the relay R217 to operate said relay. At contacts 219, relay R217 will complete an obvious locking circuit for itself by way of the winding of relay R210. However the ground potential, that operated relay R217, will short circuit R210 until contacts 227 open near the end of said sixth cycle of operation of transmitter 201, at which time R210 will operate in series with R217 and at which time the magnet M231 will restore because it does not remain sufficiently energized in series with relay R210 over the circuit extending from contacts 208, winding of R210, contacts 219 and 233 to battery on the winding of M231. M321 restoring causes the wipers 270–275 to be stepped to the first accessible contacts in the bank, in which position relay R235 is operated over an obvious circuit extending from ground over wiper 270 and the upper winding of R235 to battery. R235 restores relay R205 at contacts 236; but relay R250 will be held operated over a circuit including its upper winding and contacts 253 and 248 (it will be noted that relay R3930X is a marginal relay and will not operate in series with relay R205 in case that R205 has been connected to relay R250 by means of another cross office unit); at contacts 237, R235 completes an obvious self interrupting circuit for the magnet M321 to cause said magnet to advance the wipers 270–275 step by step to the sixth contacts accessible to the wipers; and, at contacts 238, R235 completes an obvious circuit for holding itself operated.

When relay R217 operated as described above, it closed contacts 218 to complete an obvious circuit for energizing the magnet M229. When R210 subsequently energizes as described above, it opens contacts 212 to restore M229, thereby to cause the wipers 260–267 to step to the next accessible contacts; at contacts 211, opens the original operating circuit of M229; at contacts 213, opens the circuit of the clutch magnet M220 to stop the transmitter 201. When R205 restores in response to the operation of R235, it opens contacts 208 to restore the relays R210 and R217. The cross office identifying unit 200 is now in its normal position and can be seized by any other cross office unit which may be waiting to send a message over an outgoing line to which it has been connected.

When relay R235 operated as described above, it opened contacts 239 to disconnect the transmitter 201 from the polar relay R4440X; and, at contacts 240, connects the outgoing transmitter 3430X of the cross office unit 3400X (not shown in Fig. 2) to said polar relay R4440X. The cross office unit 3400X is now ready to transmit a message stored therein over the outgoing line L1X. When the entire message has been transmitted over the outgoing line L1X, a circuit (not shown herein) is effective for opening the circuit over which relay R3940X and R4350X have been held operated. Said relays R3940X and R4350X restore. At contacts 245, R3940X restores relay R235; and, at contacts 248, relay R4350X restores relay R250. Those elements of the cross office unit 3400X and the outgoing line circuit shown in Fig. 2 herein are now in their original condition.

While there has been described what is at present believed to be the preferred embodiment of the invention, it will be understood that various modifications may be made therein; and it is contemplated to cover in the appended claims all such modifications as fall within the true spirit and scope of the invention.

What is claimed is:

1. For use in a telegraph system wherein a message is received over an incoming line and is recorded on a tape in an incoming line circuit and wherein a control unit operates consequent to the sensing of an address designation accompanying said message to select one of a plurality of switching units, to selectively connect said selected switching unit to a desired outgoing line, to cause the message to be retransmitted to and recorded in said selected switching unit and to cause a sending means in the selected switching unit to thereafter transmit the message over said desired outgoing line when said line becomes idle, a switching unit identifying circuit comprising an electric switch for said one switching unit, said electric switch including a set of wipers having a plurality of step positions and including bank contacts accessible to said wipers, the bank contacts accessible in each of certain of said wiper positions being marked in a manner corresponding to a certain character of a telegraph code; a cyclically operated transmitting mechanism common to all of said switching units and having a plurality of contact sets which are sequentially operated during each cycle of operation of said mechanism; means controlled consequent to each cycle of operation of the transmitting mechanism for causing said wipers to be advanced from contacts accessible in one of said wiper positions to contacts accessible in the next succeeding position; means associated with said transmitting mechanism and controlled by said one switching unit, when said unit is ready to transmit said message over said desired outgoing line, for connecting each of the contact sets of the transmitting mechanism to said desired outgoing line and for connecting certain of said contact sets to the wipers of said electric switch, said sequential operation of said certain contact sets causing the sequential connection of said wipers to said outgoing line, whereby the outgoing line will be controlled to transmit coded information in accordance with the marking of the bank contacts of said electric switch; and means thereafter operated and effective for disconnecting the contact sets of said transmitting mechanism from said desired outgoing line and for connecting said desired outgoing line to the sending means in said one switching unit for transmission of the message thereover.

2. The combination claimed in claim 1 wherein each of said switching units has one of said electric switches with its bank contacts marked in a manner corresponding to certain coded intelligence and wherein said third-mentioned means includes a selecting switch and means associated with said selecting switch and with each of said switching units for connecting said selecting switch to a desired one of said electric switches for the transmission of the coded intelligence recorded on the bank contacts of said desired electric switch.

3. For use in a telegraph system wherein each one of a plurality of transmitting units are connectable to an outgoing line for transmission of messages thereover, an identifying unit common to all of said transmitting units and comprising a special switch for each of said transmitting units; each special switch including a set of wipers having a plurality of positions and including bank contacts accessible to the wipers; the bank contacts accessible in each of certain wiper positions being marked in a manner corresponding to a certain character of a telegraph code; a cyclically operated transmitting mechanism in which a plurality of contact sets are sequentially operated during each cycle of operation of said mechanism; switching means controlled by a calling one of said transmitting units for connecting each of said contact sets to the outgoing line and for connecting certain of said contact sets to the wipers of the one special switch of the calling transmitting unit; means controlled consequent to each cycle of operation of the transmitting mechanism for causing the wipers of said one special switch to be advanced from contacts accessible in one of said positions to contacts accessible in the next succeeding position; the sequential operation of said certain contact sets causing the wipers of said one special switch to be sequentially connected to the outgoing line, whereby the outgoing line is controlled to transmit coded information in accordance with the marking of the bank contacts of said one special switch; and means thereafter operated and effective for disconnecting the contact sets of the transmitting mechanism from said outgoing line and for connecting said outgoing line to said calling transmitting unit for transmission of a message thereover.

4. A circuit arrangement for transmitting coded intelligence, said circuit arrangement comprising a marking switch, a selector switch and a cyclically operated pulse transmitter, said marking switch including a set of wipers having a plurality of positions and including bank contacts accessible to the wipers, the bank contacts accessible in each of certain of said wiper positions being marked in a manner corresponding to a certain character of a telegraph code, a plurality of contact sets in said pulse transmitter mechanism sequentially operated during each cycle of operation of said mechanism, said selector switch having a plurality of wipers, means for operating the wipers of said selector switch to connect the wipers of the marking switch to the contact sets of the pulse transmitter, means controlled by one of said contact sets for advancing wipers of said marking switch from contacts accessible in one of said positions to contacts accessible in the next succeeding position, a signal circuit, the sequential operation of said remaining ones of said transmitter contact sets connecting the wipers of the marking switch by way of the wipers of the selector switch to said signal circuit, whereby said signal circuit is controlled by the coded information recorded on the bank contacts of said marking switch.

5. A circuit arrangement for transmitting coded intelligence, as claimed in claim 4 wherein said means for advancing the wipers of said marking switch comprises a stepping magnet for said marking switch and a circuit including said one contact set, a wiper of said selector switch, and said stepping magnet.

6. A circuit arrangement for transmitting coded intelligence, as claimed in claim 4 including means for operating the cyclically operated pulse transmitter when said stepping switch wipers are at a particular position.

References Cited in the file of this patent

UNITED STATES PATENTS

| | | |
|---|---|---|
| 1,971,686 | Kinkead | Aug. 28, 1934 |
| 2,339,293 | Reiber | Jan. 18, 1944 |
| 2,574,362 | Warburton | Nov. 6, 1951 |
| 2,677,011 | Burwell | Apr. 27, 1954 |